US012021378B2

(12) United States Patent
Varian et al.

(10) Patent No.: US 12,021,378 B2
(45) Date of Patent: Jun. 25, 2024

(54) AUXILIARY ENERGY CIRCUIT FOR BATTERY-POWERED POWER TOOL

(71) Applicant: MILWAUKEE ELECTRIC TOOL CORPORATION, Brookfield, WI (US)

(72) Inventors: William Varian, Menomonee Falls, WI (US); Aditya Subramanian, Milwaukee, WI (US); Ryan B. Jipp, Brookfield, WI (US); Samuel Sheeks, Germantown, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 18/341,240

(22) Filed: Jun. 26, 2023

(65) Prior Publication Data
US 2023/0336020 A1 Oct. 19, 2023

Related U.S. Application Data

(63) Continuation of application No. 17/325,530, filed on May 20, 2021, now Pat. No. 11,689,050, which is a continuation of application No. 16/521,664, filed on Jul. 25, 2019, now Pat. No. 11,031,811.

(60) Provisional application No. 62/703,296, filed on Jul. 25, 2018.

(51) Int. Cl.
*H02P 3/14* (2006.01)
*H02J 7/00* (2006.01)
*H02J 11/00* (2006.01)
*H02K 7/14* (2006.01)

(52) U.S. Cl.
CPC ............. *H02J 11/00* (2013.01); *H02J 7/0068* (2013.01); *H02K 7/145* (2013.01)

(58) Field of Classification Search
CPC ..... H02J 7/0068; H02K 7/145; H02K 11/215; H02K 11/27
See application file for complete search history.

(56) References Cited

U.S. PATENT DOCUMENTS

| 9,120,132 B2 | 9/2015 | White et al. |
| 11,031,811 B2 | 6/2021 | Varian et al. |
| 11,285,586 B2 * | 3/2022 | Muramatsu ............... B25F 5/02 |
| 2008/0122404 A1 * | 5/2008 | Brotto ...................... B25F 5/00 |
| | | 320/114 |
| 2008/0290842 A1 * | 11/2008 | Davis ..................... B60L 50/40 |
| | | 320/166 |

(Continued)

OTHER PUBLICATIONS

Screen shot of Google Patents Search conducted Feb. 8, 2021, by the USPTO Patent Examiner in related U.S. Appl. No. 16/521,664 (1 page).

*Primary Examiner* — Muhammad S Islam
(74) *Attorney, Agent, or Firm* — Michael Best & Friedrich LLP

(57) ABSTRACT

A power tool comprising a power tool housing, an auxiliary power source, a user input for user control of power tool operation, and a controller. The controller is configured to receive a control signal from the user input, control the power tool in response to the control signal, receive, from a sensor, a signal indicative of an operational characteristic of the power tool, and selectively provide energy from the auxiliary power source to a load of the power tool based on the operational characteristic of the power tool.

20 Claims, 5 Drawing Sheets

(56) References Cited

U.S. PATENT DOCUMENTS

2009/0208819 A1\* 8/2009 Cruise ................. H01M 50/296
  429/61
2014/0265604 A1\* 9/2014 Mergener .............. H02J 7/0025
  307/80

\* cited by examiner

AUXILIARY ENERGY CIRCUIT FOR BATTERY-POWERED POWER TOOL

RELATED APPLICATIONS

This application is a continuation of U.S. patent application Ser. No. 17/325,530, filed on May 20, 2021, which is a continuation of U.S. patent application Ser. No. 16/521,664, filed on Jul. 25, 2019, which claims the benefit of U.S. Provisional Patent Application No. 62/703,296, filed on Jul. 25, 2018, the entire content of each of which is hereby incorporated by reference.

TECHNICAL FIELD

Embodiments described herein relate to an auxiliary energy circuit for a battery-powered power tool that provides supplementary power to drive a motor of the power tool.

BACKGROUND

Electric power tools receive power from a power source to drive a load. Some electric power tools are corded to receive power from an external power source, such as a power outlet positioned on a wall. Other electric power tools receive power from a battery pack. Battery-powered power tools allow for increased portability and convenience by eliminating the need for the electric cord anchored to the external power source.

SUMMARY

In some embodiments, a power tool includes a power tool housing, an auxiliary power source, a user input for user control of power tool operation, and a controller. The controller is configured to receive a control signal from the user input, control the power tool in response to the control signal, receive, from a sensor, a signal indicative of an operational characteristic of the power tool, and selectively provide energy from the auxiliary power source to a load of the power tool based on the operational characteristic of the power tool.

In some embodiments, power tool incudes a mode selector configured to select an operational mode of the tool.

In some embodiments, the auxiliary power source includes an ultra-capacitor.

In some embodiments, the auxiliary power source is integrated within the power tool housing.

In some embodiments, the power tool includes an ultra-capacitor

In some embodiments, the load of the power tool is a motor that is coupled to an output driver, and the operational characteristic is one selected from a group consisting of a motor speed, a motor rotational position, a motor current, and a trigger pull percentage.

In some embodiments, the auxiliary power source is configured to receive charging energy from regenerative braking during operation of the power tool.

In some embodiments, a method for supplying additional energy to a power tool having a housing includes receiving, by a controller, a control signal from a user input for user control of power tool operation, controlling, by the controller, the power tool in response to the control signal, receiving, from a sensor, a signal indicative of an operational characteristic of the power tool; and selectively providing, by the controller, energy from an auxiliary power source to a load of the power tool based on the operational characteristic of the power tool.

In some embodiments, the method further incudes a mode selector configured to select an operational mode of the tool selecting, using a mode selector, an operational mode of the power tool, selectively providing the energy from the auxiliary power source to the load of the power tool based on the operational mode of the power tool.

In some embodiments, the auxiliary power source includes an ultra-capacitor.

In some embodiments, the auxiliary power source is integrated within the power tool housing.

In some embodiments, selectively providing the energy from the auxiliary power source to the load of the power tool includes connecting the auxiliary power source in series with a battery pack interface In some embodiments, the operational characteristic is one selected from a group consisting of a motor speed, a motor rotational position, a motor current, and a trigger pull percentage.

In some embodiments, selectively providing energy from an auxiliary power source to a load of the power tool includes closing a first switch, closing a second switch, and opening a third switch.

In some embodiments, the method further includes receiving, by the auxiliary power source, charging energy from regenerative braking during operation of the power tool.

In some embodiments, a power tool system includes an auxiliary power source; and a power tool. The power tool includes a power tool housing, a battery pack interface configured to receive a battery pack, a user input for user control of power tool operation, and a controller. The controller is configured to receive a control signal from the user input, control the power tool in response to the control signal, selectively provide energy from the auxiliary power source to a load of the power tool based on an operational characteristic of the power tool.

In some embodiments, the power tool system also includes a mode selector configured to select an operational mode of the power tool, wherein the controller is configured to selectively provide the energy from the auxiliary power source to the load of the power tool based on the operational mode of the power tool.

In some embodiments, the auxiliary power source includes an ultra-capacitor.

In some embodiments, the auxiliary power source is integrated within the battery pack.

In some embodiments, the load of the power tool is a motor that is coupled to an output driver, and the operational characteristic is one selected from a group consisting of a motor speed, a motor rotational position, a motor current, and a trigger pull percentage One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in a non-transitory computer-readable medium. Similarly, embodiments described herein may be implemented as a non-transitory computer-readable medium storing instructions executable by one or more electronic processors to perform the described functionality. As used in the present application, "non-transitory computer-readable medium" comprises all computer-readable media but does not consist of a transitory, propagating signal. Accordingly, a non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Other aspects of the invention will become apparent by consideration of the detailed description and accompanying drawings.

DETAILED DESCRIPTION

Some electric power tools receive power from a battery pack to drive a load. Battery-powered power tools allow for increased portability and convenience by eliminating the need for an electric cord. However, in some instances a power tool may require a significant amount of power, whether in duration, magnitude, or both, that exceeds the power available from the battery pack. Such instances may drain the battery quickly and cause tool or battery pack shutdown. For example, a tool and/or battery pack may shutdown in response to current exceeding an overcurrent threshold.

Embodiments disclosed herein relate to an auxiliary energy circuit for a power tool that is selectively controlled to provide auxiliary power to the power tool. The auxiliary power supplements power provided by battery pack cells. Thus, in some embodiments, the auxiliary energy circuit enables the power tool to continue to operate when executing tasks that require more power than otherwise available from battery pack cells alone. Further, in some embodiments, the auxiliary energy circuit selectively provides power to the motor, which supplements power provided by the battery pack cells, thereby reducing the power burden on the battery pack cells.

Figure 1:
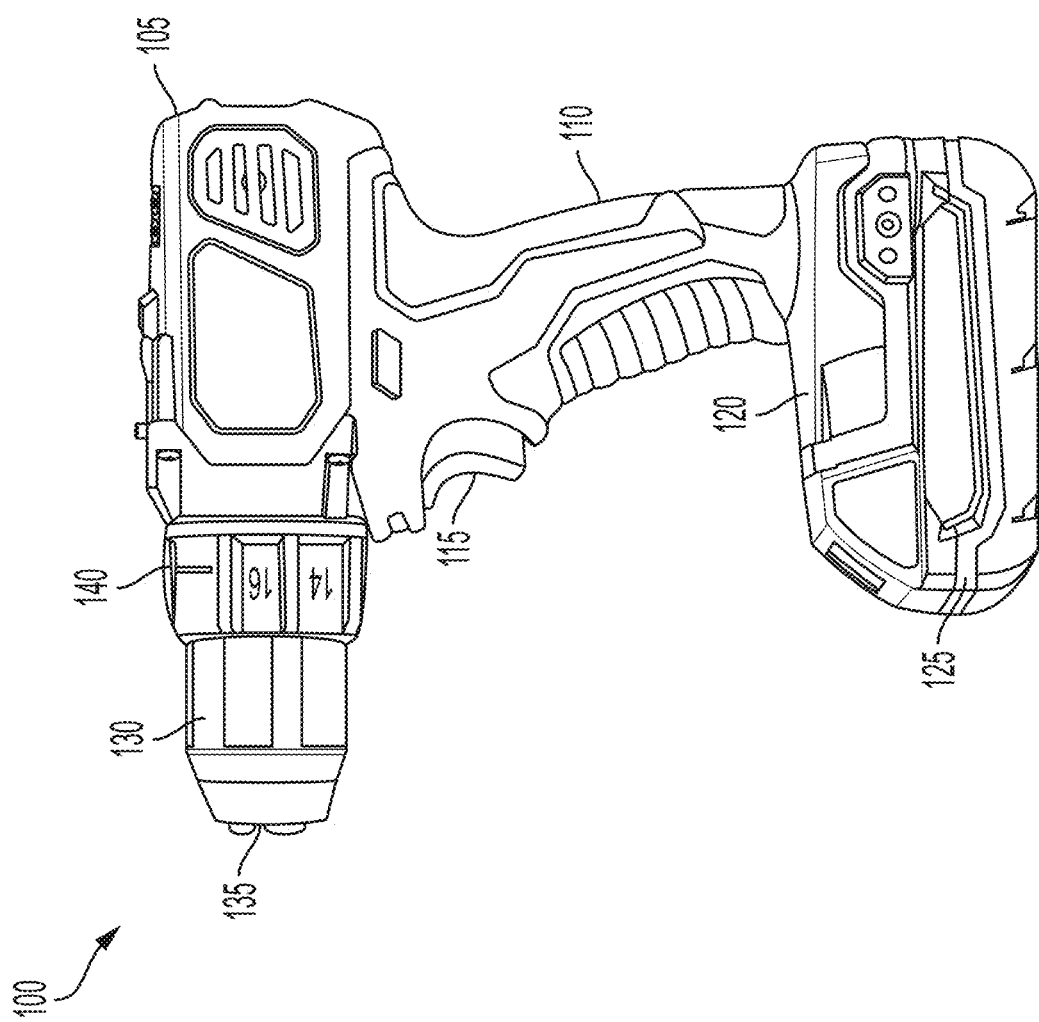
FIG. 1 illustrates an example of a battery-powered power tool with an auxiliary energy circuit.

FIG. 1 illustrates an example of a battery-powered power tool 100 including an auxiliary energy circuit. In this example, the power tool 100 is a hammer drill-driver and may be referred to as the hammer drill 100. The power tool 100 includes a tool housing 105, a handle 110, a trigger 115, a base 120, and a battery pack 125. In some embodiments, the battery pack 125 may be a rechargeable battery pack including a battery pack housing that is removably coupled to the base 120. The battery pack housing houses a plurality of battery cells and a battery controller configured to control the charging and discharging of the battery cells (e.g., via power switching elements). The plurality of battery cells may be lithium ion ("Li-ion") cells, Nickel-Cadmium ("Ni-Cad") cells, or cells of another chemistry type. Collectively, the cells may provide nominal output voltages of different values, including but not limited to 4V, 12V, 18V, 28V, 36V, and 40V. In other embodiments, the battery pack 125 may be integrated within the housing 105 of the power tool 100.

The power tool 100 receives power from the battery pack 125 and drives an output driver 130 having a tool bit receiver 135 (e.g., a chuck). The tool bit receiver 135 is configured to receive a driver bit (not shown) that drives a screw into a work material, a drill bit (not shown) that drills a hole into a work material, or another tool bit. In various embodiments, different types of tool bits may be inserted into the tool bit receiver 135 depending on properties of the work material and the desired task. A mode selector 140 is positioned on the housing 105 and allows a user to select a desired operation mode of the power tool 100 (e.g., drill, hammer drill, or drive at a particular clutch setting). In the present embodiment, the mode selector 140 is configured as a ring selector that allows the user to rotationally select the desired operation mode. In other embodiments, the mode selector 140 may be configured as another type of user interface, such as a user interface having buttons, switches, or electronic displays.

Although, the example power tool 100 is shown as a hammer drill, the power tool 100 may be any motorized power tool that is battery powered and drives an output driver (e.g., chuck, saw blade holder, or arbor). Such power tools include, for example, impact wrenches, impact drivers, nailers, reciprocating saws, circular saws, table saws, dry saws, cutters, drill-drivers, hammers, grinders, and the like.

Figure 2:
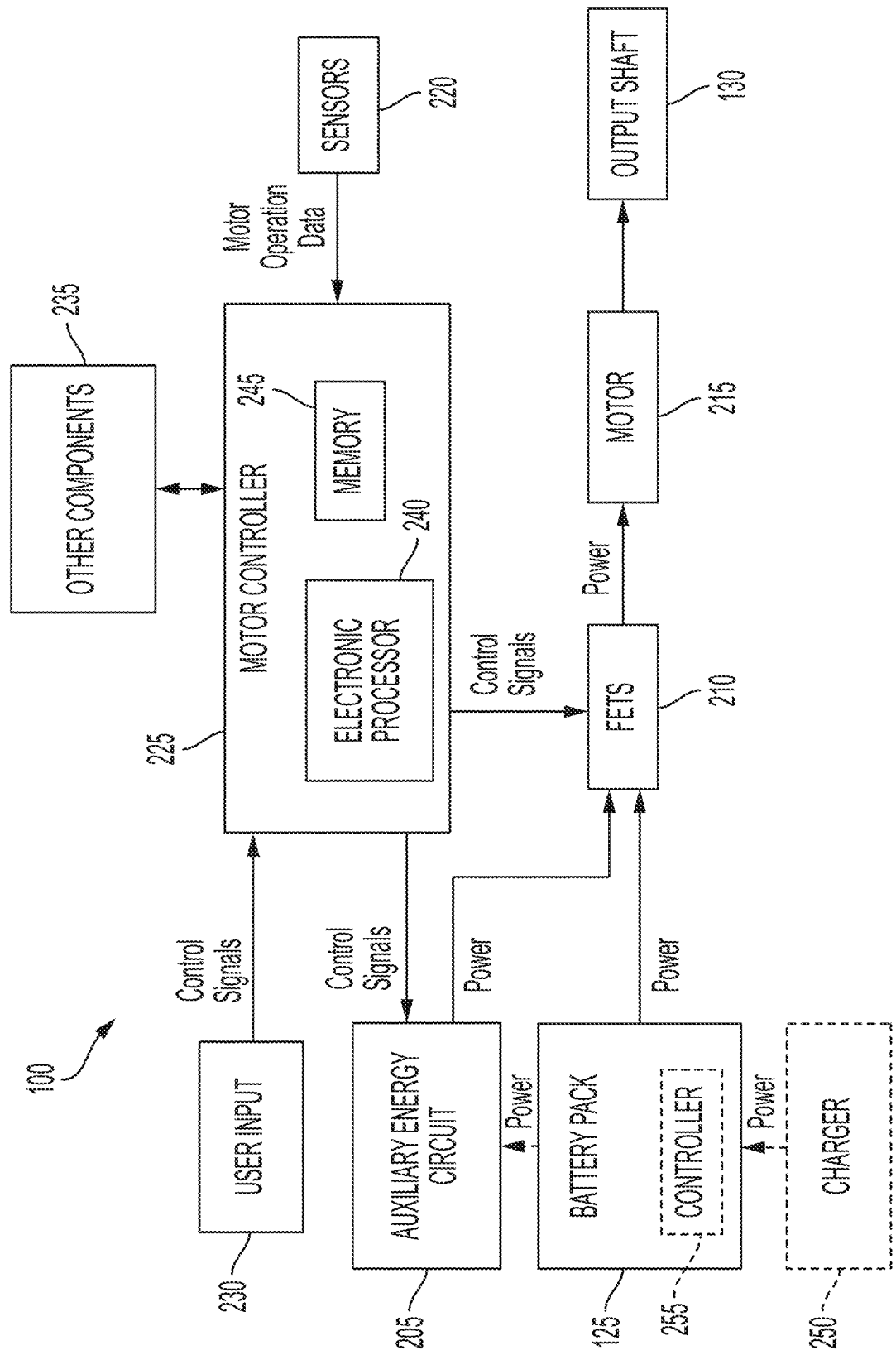
FIG. 2 is a block diagram of the example battery-powered power tool with the auxiliary energy circuit of FIG. 1.

FIG. 2 is a block diagram of the example battery-powered power tool 100 with the auxiliary energy circuit described with respect to FIG. 1. As illustrated, the power tool 100 includes, among other things, the battery pack 125, an auxiliary energy circuit 205, field effect transistors (FETs) 210, a motor 215, the output driver 130, sensors 220 (e.g., Hall Effect sensors, current sensors, trigger depression sensors, etc.), a motor controller 225, user input 230, and other components 235 (e.g., internal clock or counter, battery pack fuel gauge, work lights (LEDs), current/voltage sensors, etc.). The motor controller 225 may also be referred to as an electronic motor control unit or a motor microcontroller and includes, among other things, an electronic processor 240 and a memory 245. In some embodiments, the memory 245 stores instructions that are executable by the electronic processor 240 to implement the functionality of the motor controller 225.

In the present embodiment, the user input 230 includes the trigger 115 and the mode selector 140 and generates control signals in response to a user selection of an operation mode via the mode selector 140 and/or depressing the trigger 115. In some embodiments, a trigger depression sensor of the sensors 220 also serves as at least part of the user input 230 providing a control signal to the electronic processor 240. The trigger depression sensor may be, for example, a potentiometer providing a varying signal (e.g., between 0-5 volts) proportionally representing the amount of trigger depression. In some embodiments, the user input 230 may include other controlled user inputs, such as a forward/reverse selector, which generate responsive control signals, such as indicating a shifting of the forward/reverse selector, and are not exhaustively detailed herein.

The control signals from the user input 230 are transmitted to the electronic processor 240, which activates the FETs 210 to draw power from the battery pack 125 and accurately drive the motor 215. By selectively enabling and disabling the FETs 210, power from the battery pack 125 is selectively applied to stator windings of the motor 215 to cause rotation of a rotor of the motor 215. The rotating rotor of the motor 215 drives the output driver 130. The sensors 220 provide motor information feedback (e.g., motor current information, motor rotational position information, motor rotational velocity information, etc.), which can be used by the motor controller 225 to drive the motor 215 and, as described in further detail below, determine whether the auxiliary energy circuit 205 should be activated to provide short periods of additional power to the motor 215.

Although not shown, the motor controller 225 and other components 235 of the power tool 100 are also electrically coupled to and receive power from the battery pack 125. The FETs 210 may also be referred to as power switching elements.

Also shown in FIG. 2 is a battery charger 250 that is coupleable to the battery pack 125 to charge the battery cells of the battery pack 125. In some embodiments, the battery charger 250 may also be coupleable to the auxiliary circuit 205 via the battery pack 125 to charge the auxiliary circuit 205. For example, the battery pack 125 may include a controller 255 that includes an electronic processor and memory (not shown). The electronic processor may execute instructions stored in the memory that configure the controller 255 to selectively enable current to flow to the auxiliary circuit 205 from the charger 250 via the battery back 125.

Figure 3A:
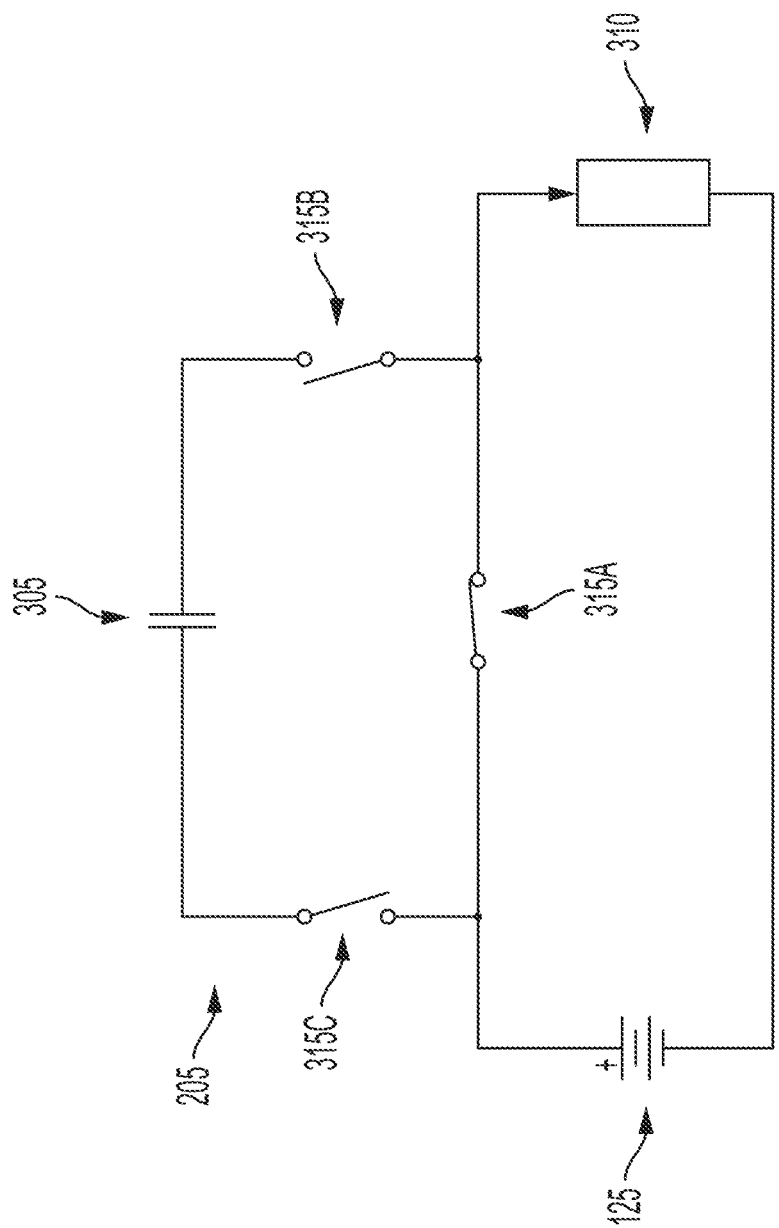
FIG. 3A illustrates a circuit schematic of the auxiliary energy circuit operating in an OFF state.
Figure 3B:
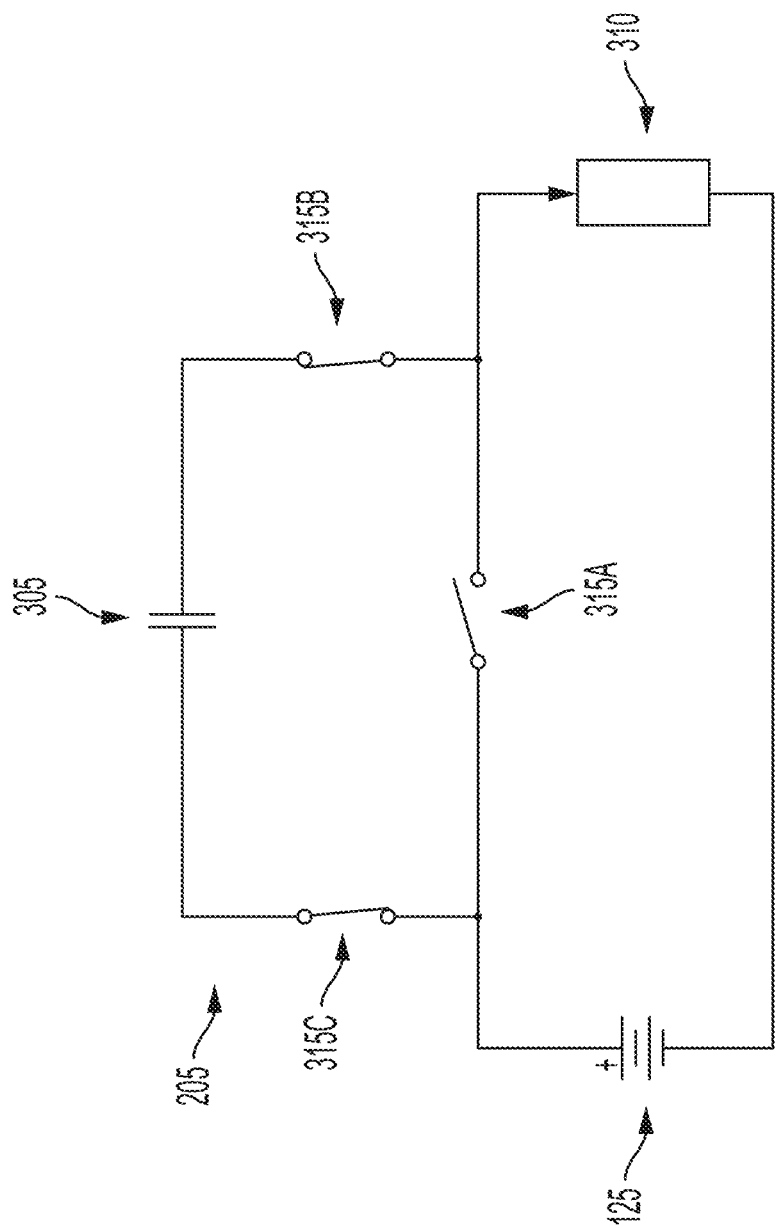
FIG. 3B illustrates a circuit schematic of the auxiliary energy circuit operating in an ON state.

FIG. 3A and FIG. 3B illustrate a circuit schematic of the auxiliary energy circuit 205 operating in an OFF state and an ON state, respectively. In some embodiments, the auxiliary energy circuit 205 includes a capacitor 305, also referred to as an auxiliary energy supply or an auxiliary power source, which is selectively connected in series to the battery pack 125 and load 310 via three switches 315A-315C. The load 310 may include, among other things, the FETs 210, the motor 215, and other electrical components of the power tool 100. In the illustrated embodiment, the capacitor 305 is a low voltage ultra-capacitor (UCAP) capable of storing, for example, 3 volts, and the switches 315A-315C are electronically controllable switches capable of a conducting ON state and a non-conducting OFF state. In other embodiments not detailed herein, other types of capacitors with different device characteristics or other circuit elements, such as high power cells, may be used instead of ultra-capacitors as the auxiliary energy supply 305. Additionally, various types of switching elements, such as transistors, MOSFETs, BJTs, etc., may be used as the switches 315A-315C. The auxiliary energy circuit 205 shown in FIGS. 3A-3B may be incorporated within either the housing 105 of the power tool 100 or within the removably coupled battery pack 125 in various embodiments.

Referring to FIG. 3A, when switch 315A is ON (closed) and switches 315B and 315C are OFF (open), the capacitor 305 is disconnected from the battery pack 125 and the load 310. Thus, the auxiliary energy circuit 205 is operating in the OFF state, and the battery pack 125 is providing the power to drive the load 310 without supplementary power from the capacitor 305. Referring to FIG. 3B, when switch 315A is OFF (open) and switches 315B and 315C are ON (closed), the capacitor 305 is connected in series to the battery pack 125 and load 310. Thus, the auxiliary energy circuit 205 is operating in the ON state (also referred to as a boost state), and the additional power provided by the capacitor 305 supplements the power provided by the battery pack 125 to drive the load 310.

In some embodiments, by selectively connecting the capacitor 305 with the battery pack 125 and load 310 in series, as opposed to in parallel, the auxiliary energy circuit 205 is able to provide additional power to drive the load 310 without needing transformers for voltage matching or boost converters for voltage step-up. This simplifies the circuitry, increases the efficiency, and decreases the size of the power tool 100, relative to a parallel-connected auxiliary energy circuit 205. Additionally, the series configuration of the auxiliary energy circuit 205 allows a higher voltage battery pack 125 and a lower voltage capacitor 305 to be used, thus decreasing the cost of manufacturing the power tool 100.

Figure 4:
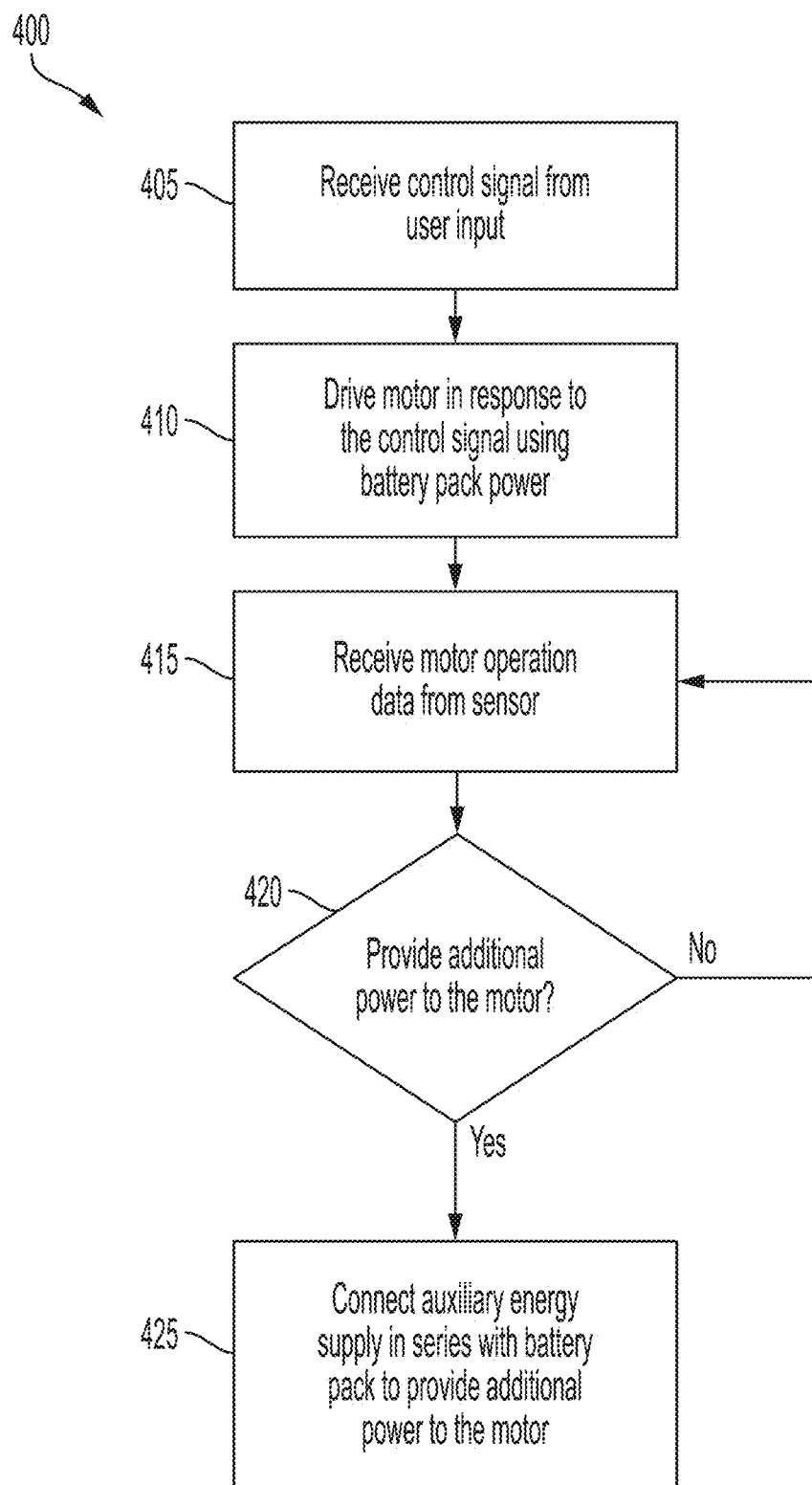
FIG. 4 is a flowchart illustrating a control method for providing auxiliary power to a battery-powered power tool based on operation parameters of the tool.

FIG. 4 is a flowchart illustrating a control method for providing auxiliary power to a battery-powered power tool based on operation parameters of the tool. In some embodiments, method 400 is implemented with one of the embodiments of the power tool 100 of FIG. 1 and, accordingly, the method 400 will be described with respect to the power tool 100. However, in some embodiments, the method 400 is implemented with other types of power tools as described above.

In block 405, the electronic processor 240 receives a control signal from the user input 230 indicating a request to drive the motor 215, such as a signal generated by the trigger 115 in response to receiving a trigger pull of the trigger 115. In block 410, in response to the received control signal, the electronic processor 240 drives the motor 215 using battery power from the battery pack 125 and, thereby, drives the output driver 130. For example, in response to the received control signal, the electronic processor 240 selectively enables and disables the FETs 210 to selectively apply power from the battery pack 125 to stator windings of the motor 215, thus driving the motor 215 and the output driver 130. In block 410, the electronic processor 240 controls the auxiliary energy circuit 205 to be deactivated by controlling switches 315B and 315C to be OFF, thus selectively disconnecting auxiliary energy supply 305 from the battery pack 125 and load 310, while controlling switch 315A to be ON to connect the battery pack 125 to the load 310 (see FIG. 3A).

In block 415, while the motor 215 is being driven, the electronic processor 240 receives motor operation data provided from at least one of the sensors 220. In various embodiments not exhaustively disclosed herein, the sensors 220 may be (1) current sensors that detect a current drawn by the motor 215, (2) Hall Effect sensors that detect a rotational velocity or acceleration of the motor 215, or (3) a combination of different types of sensors configured to measure various motor operation characteristics and provide motor operation data indicative of the measured characteristics to the electronic processor 240.

In block 420, based on the received motor information, the electronic processor 240 determines whether to provide additional power from the auxiliary energy circuit 205. For example, in some embodiments, the received motor operation data includes motor current, and the electronic processor 240 compares the motor current to a current threshold in block 420. In response to the motor current exceeding the current threshold, the electronic processor 240 determines to provide additional power from the auxiliary energy circuit 205 to the motor 215 and advances to block 425. In response to the motor current being below the current threshold, the electronic processor 240 determines not to provide additional power from the auxiliary energy circuit 205 and returns to block 415.

In another embodiment, the received motor operation data includes motor current and motor speed, and in block 420 the electronic processor 240 compares the motor speed to a speed threshold. In response to the motor speed being below the speed threshold, the electronic processor 240 compares motor current to a current threshold (also in block 420). When the motor current is above the current threshold (and the motor speed was determined to be below the speed threshold), the electronic processor 240 determines to provide additional power from the auxiliary energy circuit 205 to the motor 215 and advances to block 425. In response to the motor speed being above the speed threshold, or the motor current being below the current threshold, the electronic processor 240 determines not to provide additional power from the auxiliary energy circuit 205 and returns to block 415. In some embodiments, the motor speed is compared to the speed threshold after or at the same time as the motor current is compared to the current threshold, rather than before the motor current comparison, in block 420.

In another embodiment, the received motor operation data includes motor speed and trigger pull amount, and in block 420, the electronic processor 240 compares the motor speed to a speed threshold. In response to the motor speed being below the speed threshold, the electronic processor 240 compares the trigger pull amount to a pull threshold (also in block 420). When the trigger pull amount is above the pull threshold (e.g., pulled more than 50% or another threshold value), the electronic processor 240 determines to provide additional power from the auxiliary energy circuit 205 and advances to block 425. In response to the motor speed being above the speed threshold, or the trigger pull amount being below the pull threshold, the electronic processor 240 determines not to provide additional power from the auxiliary energy circuit 205 and returns to block 415. In some embodiments, in block 420, the motor speed is compared to the speed threshold after the trigger pull amount is compared to the pull threshold, rather than before the trigger pull amount comparison.

In step 420, when the electronic processor 240 determines not to provide additional power from the auxiliary energy circuit 205, blocks 415-420 are repeated while the motor continues to be driven by the trigger pull. On the other hand, in step 420, when the electronic processor 240 determines to provide additional power to the motor 215 from the auxiliary energy circuit 205, the electronic processor 240 continues to block 425 and connects the auxiliary energy supply 305 in series with the battery pack 125 to provide additional power to the motor 215. For example, to implement block 425, the electronic processor 240 activates the auxiliary energy circuit 205 by turning switch 315A OFF and switches 315B and 315C ON (see FIG. 3B). This action selectively connects the auxiliary energy supply 305 to the battery pack 125 and load 310 in series such that the additional power discharging from the auxiliary energy supply 305 adds to the power provided by the battery pack 125 to drive the motor 215. In those embodiments in which the auxiliary energy circuit 205 is included within the battery pack 125, in step 425, connecting the auxiliary energy supply 305 in series with the battery pack 125 refers to connecting the auxiliary energy supply 305 in series with the battery cells of the battery pack 125.

In some embodiments, the auxiliary energy supply 305 may be connected in series with the battery pack 125 for a predetermined time period as determined by an internal clock or counter. After the predetermined time period, the electronic processor 240 deactivates the auxiliary energy circuit 205 by turning switch 315A ON and switches 315B and 315C OFF, thus selectively disconnecting auxiliary energy supply 305 from the battery pack 125 and load 310. The electronic processor 240 then returns to block 415 and the method 400 continues. Regardless of the present block in the method 400 being executed, the electronic processor 240 may ultimately exit the method 400 and stop driving the motor, for example, in response to release of the trigger 115.

In other embodiments, after connecting the auxiliary energy supply 305 in step 425, the electronic processor 240 returns to block 415 to receive further motor operation data and again determine whether to provide additional power from the auxiliary energy circuit 205 in step 420. In the event that the conditions of block 420 continue to be true, as determined by the electronic processor 240 based on the motor operation data, the electronic processor 240 continues to maintain the auxiliary energy circuit 205 in an activated state. However, in block 420, when the electronic processor 240 determines that additional power is not to be provided by the auxiliary energy circuit 240 based on further motor operation data (e.g., one or more of the motor current falls below the current threshold, the motor speed rises above the speed threshold, and the trigger pull falls below the pull threshold), the electronic processor 240 deactivates the auxiliary energy circuit 205. For example, the electronic processor 240 disconnects the auxiliary energy supply 305 from the battery pack 125 by controlling the switch 315A to be ON and switches 315B and 315C to be OFF. Further, regardless of the present block in the method 400 being executed, the electronic processor 240 may exit the method 400 and stop driving the motor, for example, in response to release of the trigger 115.

In some embodiments, the method 400 further includes a charging block (not shown) executed before block 405. For example, in the case when the auxiliary energy circuit 205 is integrated within the battery pack 125, the capacitor 305 is charged when the battery pack 125 is coupled to the battery pack charger 250. For example, the controller 255 of the battery pack 125 may control the charging of the capacitor 305 of the auxiliary energy circuit 205 by selectively connecting the capacitor 305 to a terminal of the power tool battery pack charger 250 over which charging power is provided. As another example, in the case when the auxiliary energy circuit 205 is integrated within the tool housing 105, the capacitor 305 may be charged through energy recapture from regenerative braking of the motor 215 during operation. For example, upon release of the trigger 115 during operation of the tool 100, kinetic energy of the rotating rotor of the motor 215 induces current in the stator windings of the motor 215. The stator windings are then selectively coupled to the capacitor 305 (e.g., via switches 315B and 315C) to charge the capacitor 305 with the induced current. Other methods of controlling the charge and discharge cycles of the capacitor 305 may be implemented in various embodiments and not exhaustively detailed herein.

Thus, embodiments described herein provide, among other things, an auxiliary energy circuit in a battery-powered power tool that provides additional power output based on motor operational data and a control method of providing said additional power based on motor operational data for a battery-powered power tool.

We claim:

1. A power tool comprising:
a power tool housing;
an auxiliary power source;
a user input for user control of power tool operation;
a controller configured to:
receive a control signal from the user input,
control the power tool in response to the control signal,
receive, from a sensor, a signal indicative of an operational characteristic of the power tool, and
selectively provide energy from the auxiliary power source to a load of the power tool based on the operational characteristic of the power tool.

2. The power tool of claim 1, further comprising:
a mode selector configured to select an operational mode of the power tool;
wherein the controller is configured to selectively provide the energy from the auxiliary power source to the load of the power tool based on the operational mode of the power tool.

3. The power tool of claim 1, wherein the auxiliary power source includes an ultra-capacitor.

4. The power tool of claim 1, wherein the auxiliary power source is integrated within the power tool housing.

5. The power tool of claim 1, further comprising:
a battery pack interface configured to receive a battery pack;
wherein, to selectively provide the energy from the auxiliary power source to the load of the power tool, the controller is configured to connect the auxiliary power source in series with the battery pack interface.

6. The power tool of claim 1, wherein:
the load of the power tool is a motor that is coupled to an output driver; and
the operational characteristic is one selected from a group consisting of a motor speed, a motor rotational position, a motor current, and a trigger pull percentage.

7. The power tool of claim 6, wherein the auxiliary power source is configured to receive charging energy from regenerative braking during operation of the power tool.

8. A method for supplying additional energy to a power tool, the power tool including a power tool housing, the method comprising:
receiving, by a controller, a control signal from a user input for user control of power tool operation;
controlling, by the controller, the power tool in response to the control signal;
receiving, from a sensor, a signal indicative of an operational characteristic of the power tool; and
selectively providing, by the controller, energy from an auxiliary power source to a load of the power tool based on the operational characteristic of the power tool.

9. The method of claim 8, further comprising:
selecting, using a mode selector, an operational mode of the power tool; and,
selectively providing the energy from the auxiliary power source to the load of the power tool based on the operational mode of the power tool.

10. The method of claim 8, wherein the auxiliary power source includes an ultra-capacitor.

11. The method of claim 8, wherein the auxiliary power source is integrated within the power tool housing.

12. The method of claim 8, wherein selectively providing the energy from the auxiliary power source to the load of the power tool includes connecting the auxiliary power source in series with a battery pack interface.

13. The method of claim 8, wherein the operational characteristic is one selected from a group consisting of a motor speed, a motor rotational position, a motor current, and a trigger pull percentage.

14. The method of claim 8, wherein, selectively providing energy from an auxiliary power source to a load of the power tool includes closing a first switch, closing a second switch, and opening a third switch.

15. The method of claim 8, further comprising:
receiving, by the auxiliary power source, charging energy from regenerative braking during operation of the power tool.

16. A power tool system comprising:
an auxiliary power source; and,
a power tool including:
a power tool housing;
a battery pack interface configured to receive a battery pack;
a user input for user control of power tool operation; and,
a controller configured to:
receive a control signal from the user input,
control the power tool in response to the control signal, and
selectively provide energy from the auxiliary power source to a load of the power tool based on an operational characteristic of the power tool.

17. The power tool system of claim 16, further comprising:
a mode selector configured to select an operational mode of the power tool;
wherein the controller is configured to selectively provide the energy from the auxiliary power source to the load of the power tool based on the operational mode of the power tool.

18. The power tool system of claim 16, wherein the auxiliary power source includes an ultra-capacitor.

19. The power tool system of claim 16, wherein the auxiliary power source is integrated within the battery pack.

20. The power tool system of claim 16, wherein:
the load of the power tool is a motor that is coupled to an output driver; and
the operational characteristic is one selected from a group consisting of a motor speed, a motor rotational position, a motor current, and a trigger pull percentage.

\* \* \* \* \*